(12) United States Patent
Takahashi et al.

(10) Patent No.: US 7,761,686 B2
(45) Date of Patent: Jul. 20, 2010

(54) ADDRESS TRANSLATOR AND ADDRESS TRANSLATION METHOD

(75) Inventors: Seigo Takahashi, Kawasaki (JP); Atsushi Ike, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 835 days.

(21) Appl. No.: 10/972,429

(22) Filed: Oct. 26, 2004

(65) Prior Publication Data

US 2005/0273572 A1   Dec. 8, 2005

(30) Foreign Application Priority Data

Jun. 2, 2004   (JP)   ............... 2004-164586

(51) Int. Cl.
 G06F 12/00   (2006.01)
 G06F 12/08   (2006.01)
 G06F 12/10   (2006.01)
(52) U.S. Cl. .......................... 711/203; 711/6; 711/170; 711/206; 711/207
(58) Field of Classification Search ................. 711/200, 711/202, 203, 205, 207, 6, 170, 206
See application file for complete search history.

(56) References Cited

U.S. PATENT DOCUMENTS

| | | | | |
|---|---|---|---|---|
| 5,053,951 A * | 10/1991 | Nusinov et al. | ............. | 711/206 |
| 5,101,346 A * | 3/1992 | Ohtsuki | ............. | 718/100 |
| 5,721,922 A * | 2/1998 | Dingwall | ............. | 718/103 |
| 5,903,752 A * | 5/1999 | Dingwall et al. | ............. | 718/103 |
| 6,073,224 A * | 6/2000 | Watkins | ............. | 711/202 |
| 6,115,748 A * | 9/2000 | Hauser et al. | ............. | 709/234 |
| 6,173,417 B1 * | 1/2001 | Merrill | ............. | 714/15 |
| 6,275,917 B1 * | 8/2001 | Okada | ............. | 711/207 |
| 6,742,103 B2 * | 5/2004 | Chauvel et al. | ............. | 711/207 |
| 6,832,333 B2 * | 12/2004 | Johnson et al. | ............. | 714/25 |
| 6,851,030 B2 * | 2/2005 | Tremaine | ............. | 711/160 |
| 6,941,442 B2 * | 9/2005 | Devereux | ............. | 711/207 |
| 7,100,018 B2 * | 8/2006 | Zhang et al. | ............. | 711/207 |
| 7,103,748 B2 * | 9/2006 | Day et al. | ............. | 711/207 |
| 7,231,506 B2 * | 6/2007 | Ike | ............. | 711/207 |
| 7,558,940 B2 * | 7/2009 | Hancock | ............. | 711/206 |

(Continued)

FOREIGN PATENT DOCUMENTS

| | | |
|---|---|---|
| JP | 63-254544 | 10/1988 |
| JP | 5-324477 | 12/1993 |
| JP | 6-124237 | 5/1994 |
| JP | 2002-149490 | 5/2002 |

OTHER PUBLICATIONS

Barham et al. Xen and the Art of Virtualization. Oct. 22, 2003. SOSP 2003. ACM.*

(Continued)

*Primary Examiner*—Sanjiv Shah
*Assistant Examiner*—Samuel Dillon
(74) *Attorney, Agent, or Firm*—Staas & Halsey LLP

(57) ABSTRACT

An address translator capable of reducing system loads in address translation and an overhead in switching between operating systems. A plurality of address translation buffers classifies and stores virtual addresses and real addresses based on a plurality of operating systems which is run by a processor. For example, the address translation buffers store the virtual addresses and the real addresses in correspondence with the operating systems. According to a running operating system, an address translation controller accesses a corresponding address translation buffer to translate virtual addresses to real addresses.

8 Claims, 13 Drawing Sheets

U.S. PATENT DOCUMENTS

| | | | |
|---|---|---|---|
| 2002/0062434 A1* | 5/2002 | Chauvel et al. | 711/207 |
| 2003/0177334 A1* | 9/2003 | King et al. | 711/209 |
| 2004/0117592 A1* | 6/2004 | Day et al. | 711/207 |
| 2005/0027962 A1* | 2/2005 | Zhang et al. | 711/207 |
| 2007/0022421 A1* | 1/2007 | Lescouet et al. | 718/1 |

OTHER PUBLICATIONS

Patent Abstracts of Japan, Publication No. 06-052058, Published Feb. 25, 1994.

Japanese Patent Office Action, mailed Jul. 8, 2008 and issued in corresponding Japanese Patent Application No. 2004-164586.

* cited by examiner

ADDRESS TRANSLATOR AND ADDRESS TRANSLATION METHOD

CROSS-REFERENCE TO RELATED APPLICATIONS

This application is based upon and claims the benefits of priority from the prior Japanese Patent Application No. 2004-164586, filed on Jun. 2, 2004, the entire contents of which are incorporated herein by reference.

BACKGROUND OF THE INVENTION (1) Field of the Invention

This invention relates to an address translator and an address translation method and, more particularly, to an address translator and address translation method for translating a virtual address to a real address.

(2) Description of the Related Art

Because of recent increase in resources, various systems increasingly require large real address spaces, and more flexible and inexpensive address translators are demanded. For address translators, there is a virtual memory scheme for translating virtual addresses specified by a program to real addresses presented to a real memory, and this scheme greatly eases limitations on memory space.

Some of conventional address translators adopting the virtual memory scheme are provided with address translation buffers which are switched according to a supervisor mode or a user mode. The address translation buffers for the supervisor mode are not required to hold process numbers, resulting in saving memory resources (for example, refer to Japanese Unexamined Patent Publication No. 6-52058 (Paragraph [0016]-[0018], FIG. 1).

Now more systems offering real-time processing run a plurality of Operating Systems (OS) with a hybrid method.

SUMMARY OF THE INVENTION

This invention provides an address translator for translating virtual addresses to real addresses. This address translator comprises address translation buffers for classifying and storing the virtual addresses and the real addresses based on a plurality of operating systems that is run by a processor and an address translation controller for accessing an address translation buffer to translate the virtual addresses to the real address according to a running operating system.

Further, this invention provides an address translation method of translating virtual addresses to real addresses according to a running operating system by accessing one of address translation buffers for classifying and storing the virtual addresses and the real addresses based on a plurality of operating systems that is run by a processor.

The above and other features and advantages of the present invention will become apparent from the following description when taken in conjunction with the accompanying drawings which illustrate preferred embodiments of the present invention by way of example.

DESCRIPTION OF THE PREFERRED EMBODIMENTS

As stated in Description of the Related Art, systems which run a plurality of OSs with a hybrid method have a high-load problem due to algorithms and control circuits because, for example, the contents of an address buffer should be changed so that the OSs do not use the same address map.

In addition, because of high system loads, such systems have an overhead problem in that long delays happen in switching between OSs.

This invention has been made in view of foregoing and intends to provide an address translator and address translation method capable of reducing system loads and an overhead in switching between OSs.

Figure 1:
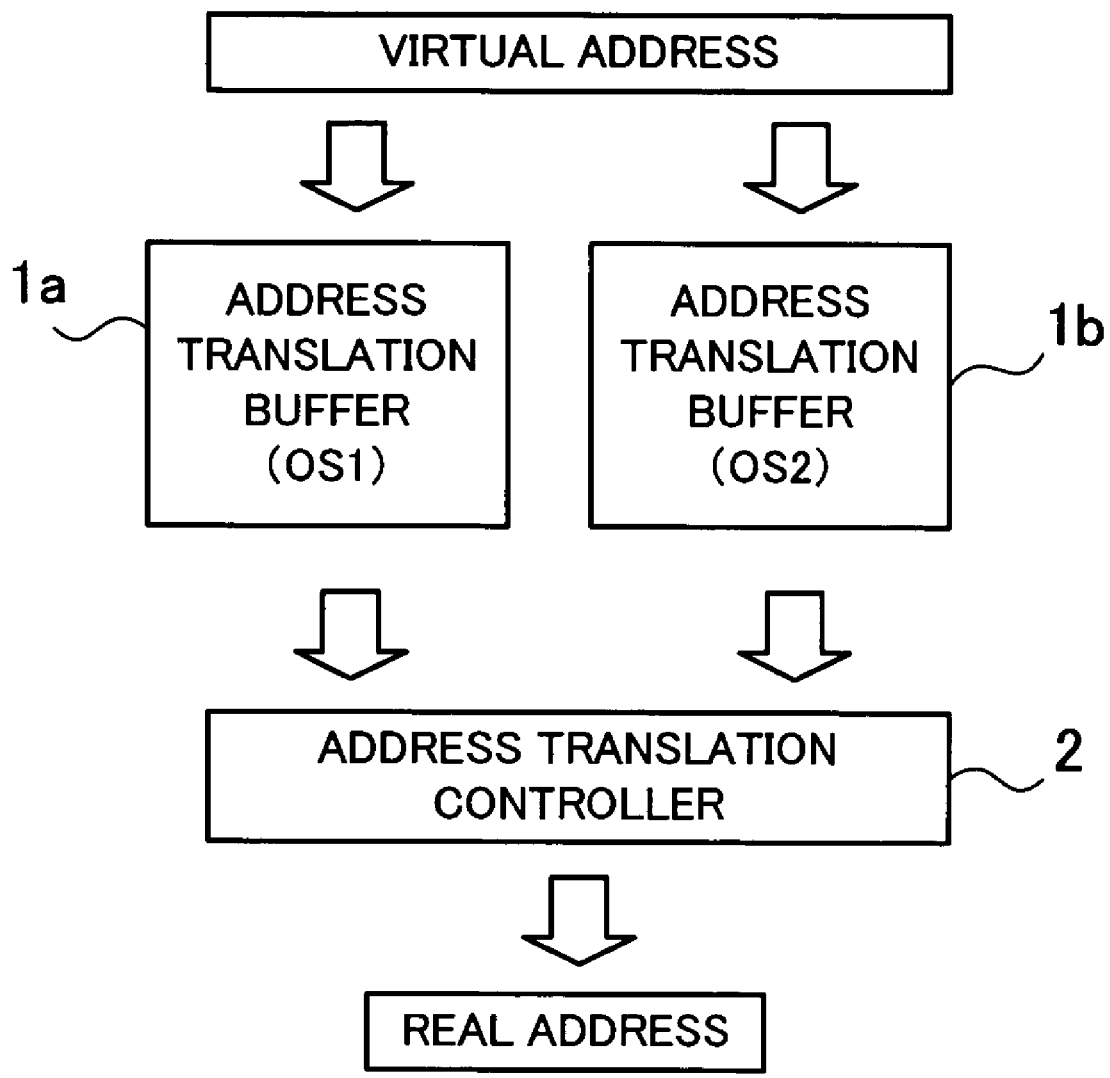
FIG. 1 is a principle view of an address translator of this invention.

The principle of this invention will be now described in detail with reference to FIG. 1.

Referring to this Figure, an address translator of this invention has address translation buffers 1a and 1b and an address translation controller 2.

The address translation buffers 1a and 1b classify and hold virtual addresses and real addresses based on a plurality of operating systems that is run by a processor. For example, the address translation buffer 1a stores virtual addresses and real addresses for an operating system OS1 while the address translation buffer 1b stores virtual addresses and real addresses for an operating system OS2.

The address translation controller 2 accesses an address translation buffer 1a, 1b to translate virtual addresses to real addresses according to a running operating system OS1, OS2. For example, while the processor runs the operating system OS1, the address translation controller 2 accesses the address translation buffer 1a for the virtual-to-real address translation.

Since it is not necessary to change the contents of the address translation buffers 1a and 1b when the operating systems are switched, system loads can be reduced. In addition, an overhead in switching between the operating systems can be reduced.

The first embodiment will be now described in detail.

Figure 2:
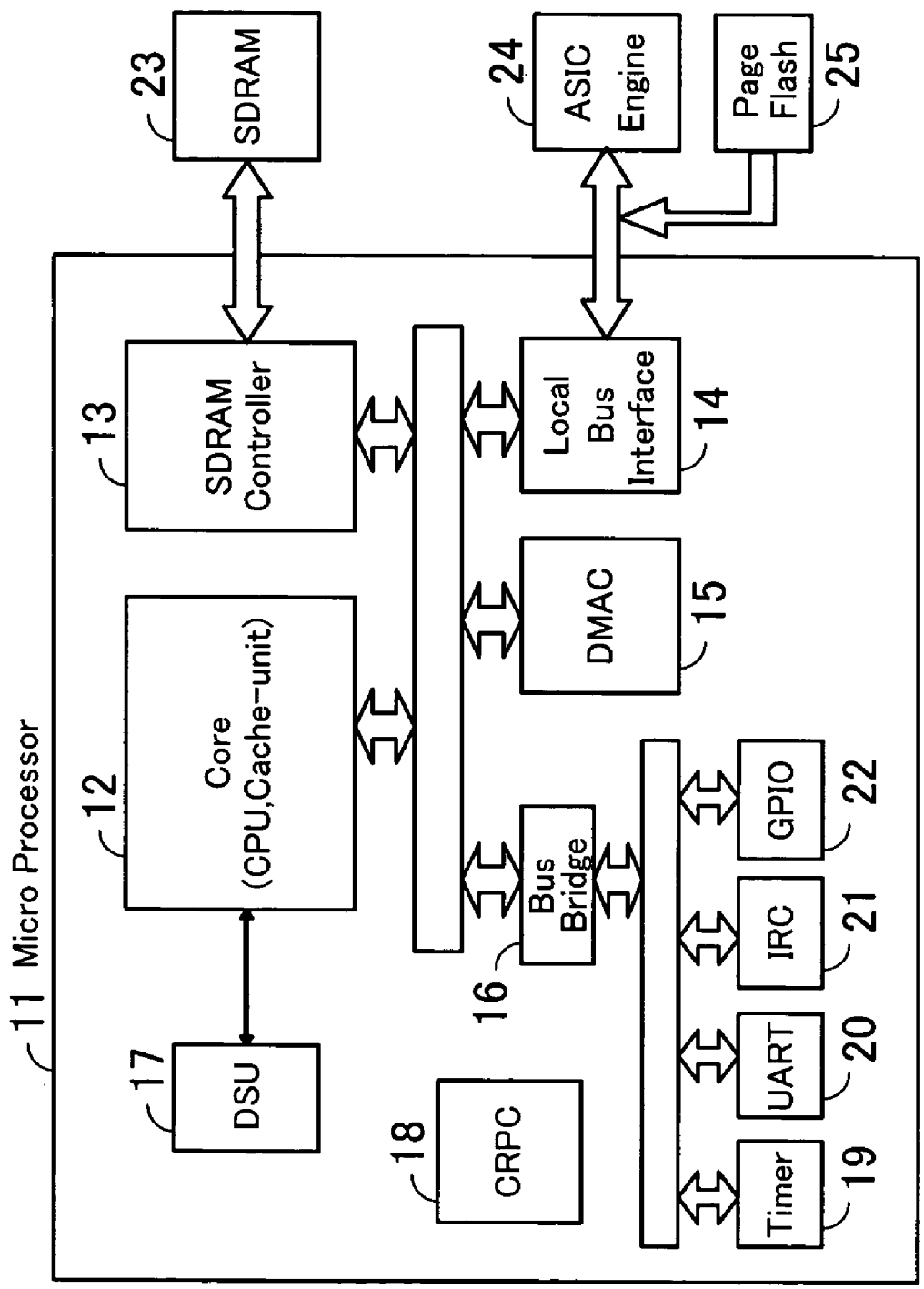
FIG. 2 shows an example of hardware structure of a micro processor according to the first embodiment.

FIG. 2 shows an example of hardware structure of a micro processor according to the first embodiment.

Referring to this figure, the Micro Processor 11 is a one-chip semiconductor device which is provided with a Core 12, a Synchronous DRAM (SDRAM) Controller 13, a Local Bus Interface 14, a Direct Memory Access Controller (DMAC) 15, a Bus Bridge 16, a Debug Support Unit (DSU) 17, a Clock Reset Power Control (CRPC) 18, a Timer 19, a Universal Asynchronous Receiver/Transmitter (UART) 20, an Internet Controller (IRC) 21 and a General Purpose Input/Output (GPIO) 22. The Core 12 may be an Arithmetic Logical Unit (ALU). Connected to the Micro Processor 11 are an SDRAM 23, an ASIC Engine 24, and a Flash Memory 25.

The Core 12 includes a Central Processing Unit (CPU) and a Cache-unit. The CPU of the Core 12 controls each unit according to data (including programs) being stored in the SDRAM 23, for example. In controlling, the CPU loads and stores the data with the Cache-unit.

Figure 3:
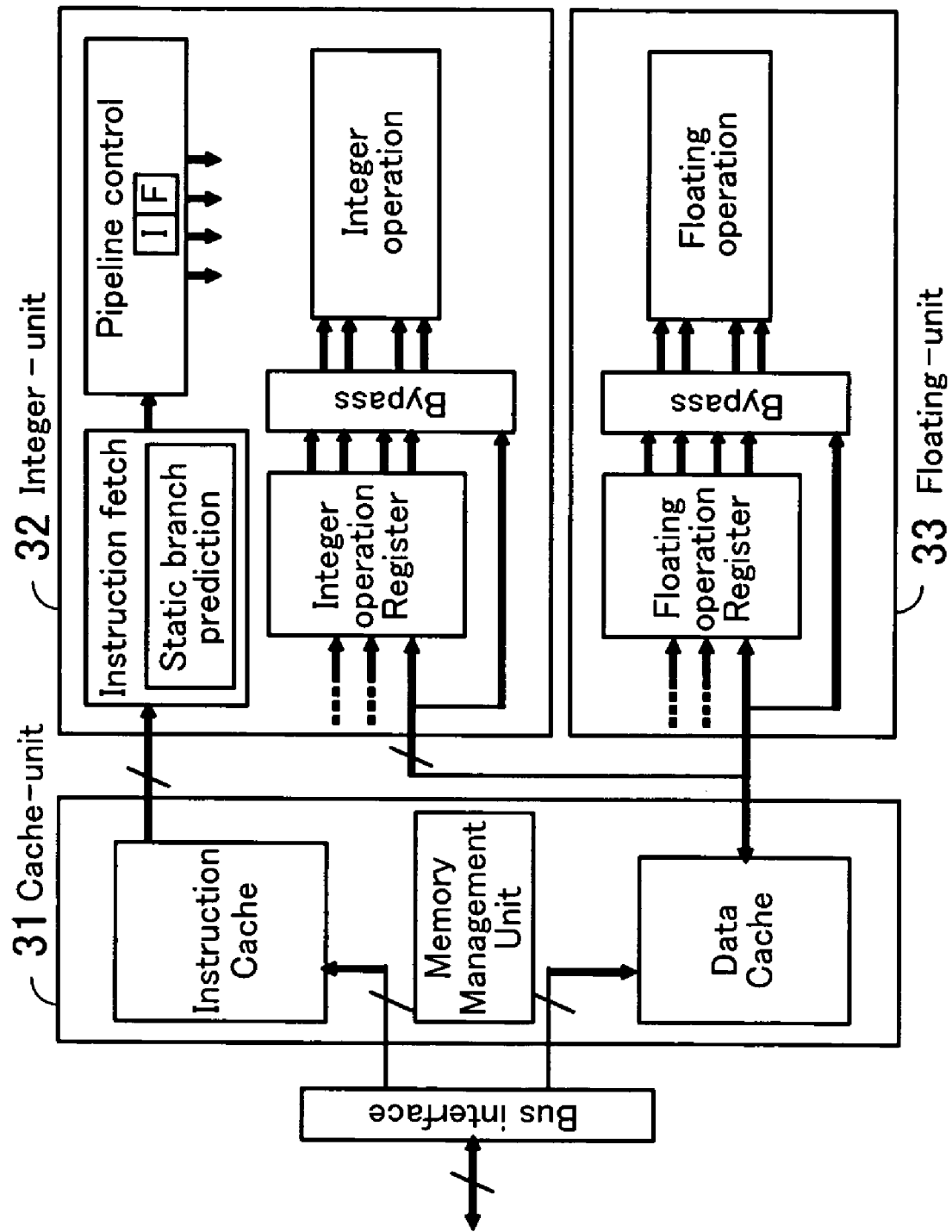
FIG. 3 shows an example of hardware structure of a core.

The Core 12 will be now described in detail with reference to FIG. 3.

Referring to this figure, the Core 12 includes the Cache-unit 31, an Integer-unit 32, and a Floating-unit 33. The Integer-unit 32 and the Floating-unit 33 are part of the CPU, and perform integer operation and floating-point operation by communicating data with the Cache-unit 31.

The Cache-unit 31 has an Instruction Cache, an address translation unit (Memory Management Unit), and a Data Cache. The Memory Management Unit controls address translation of data with a virtual address method, the data being communicated between the Instruction Cache or the Data Cache and the Integer-unit 32 or the Floating-unit 33. Note that the Instruction Cache is a cache for storing instruction codes and the Data Cache is a cache for storing data.

The Cache-unit 31 will be described in detail with reference to FIG. 4.

Referring to this figure, the Cache-unit 31 has the Memory Management Unit (MMU) 41, the Instruction Cache 46, and the Data Cache 47. Connected to the MMU 41 is a Special-purpose Register (SR) 48. The SR 48 may be installed in or externally attached to the Cache-unit 31.

The MMU 41 has an MMU Controller 42, an Instruction Address Map Register (IAMR) 43, a Data Address Map Register (DAMR) 44, and a Translation Look-aside Buffer (TLB) 45.

The SR 48 has a Hardware Status Register (HSR) 48a, an Instruction Address Map Valid Register (IAMVR) 48b, and a Data Address Map Valid Register (DAMVR) 48c.

The IAMR 43, the DAMR 44, and the TLB 45 store virtual addresses specified by programs and real addresses presented to a real memory in association with each other.

The IAMR 43 and the DAMR 44 statically store the virtual addresses and the real addresses. That is, once a virtual address and a real address are stored by a program in the IAMR 43 or the DAMR 44, their correspondence is fixed.

The TLB 45 dynamically stores the virtual addresses and the real addresses. That is, when new data, not in Cache nor TLB, is additionally registered in the Instruction Cache 46 or the Data Cache 47, the virtual address and real address of the least-recently used data are taken out of the TLB 45. Then the virtual address and real address of the new data are stored in the TLB 45.

The MMU controller 42 controls the above storage by accessing the HSR 48.

Note that the IAMR 43 stores the virtual addresses and the real addresses for instruction codes and the DAMR 44 stores the virtual addresses and the real addresses for data. Since the TLB 45 operates dynamically, it is capable of handling large size data.

The Micro Processor 11 is capable of running a plurality of OSs with a hybrid method to perform real-time processing. For example, Linux normally runs and when real-time processing is required, for example, when interruption is made, ITRON runs. In the following description, the Micro Processor 11 runs Linux and ITRON as OSs.

A memory region used by ITRON is much smaller than that by Linux. A small part of the memory region for Linux is used for kernel and a large part thereof is for user applications. Therefore, the MMU 41 allocates the static IAMR 43 and DAMR 44 to ITRON and the Linux kernel, and allocates the dynamic TLB 45 to the Linux user applications.

Figure 5:
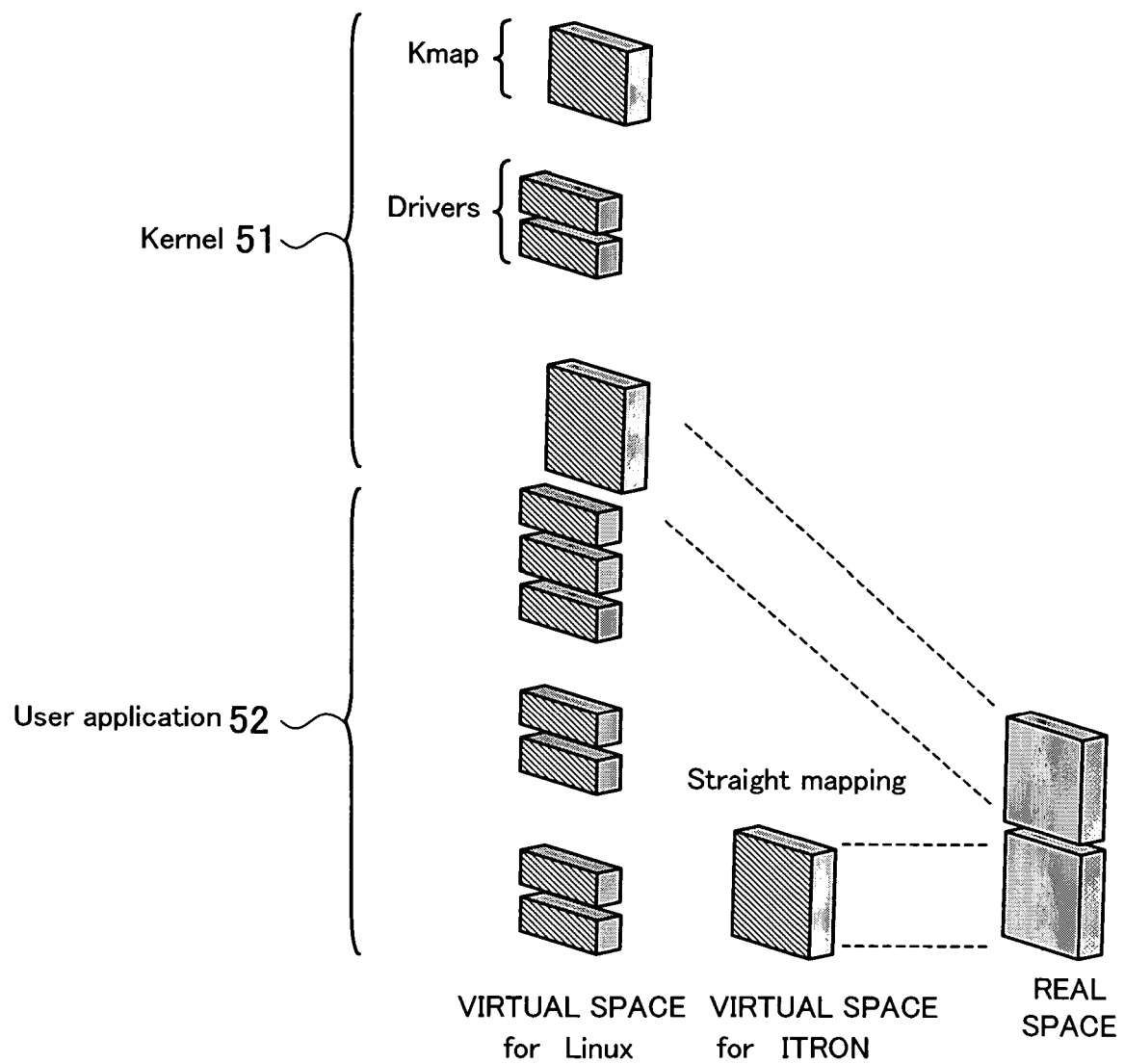
FIG. 5 illustrates memory maps for ITRON and Linux.

FIG. 5 shows memory maps for ITRON and Linux.

This figure shows virtual spaces for Linux and ITRON. The virtual space for Linux is divided into a Kernel region 51 and a User application region 52. The Kernel region 51 has a Kmap region and a Driver region. The memory space for ITRON is much smaller than that for Linux.

Figure 6:
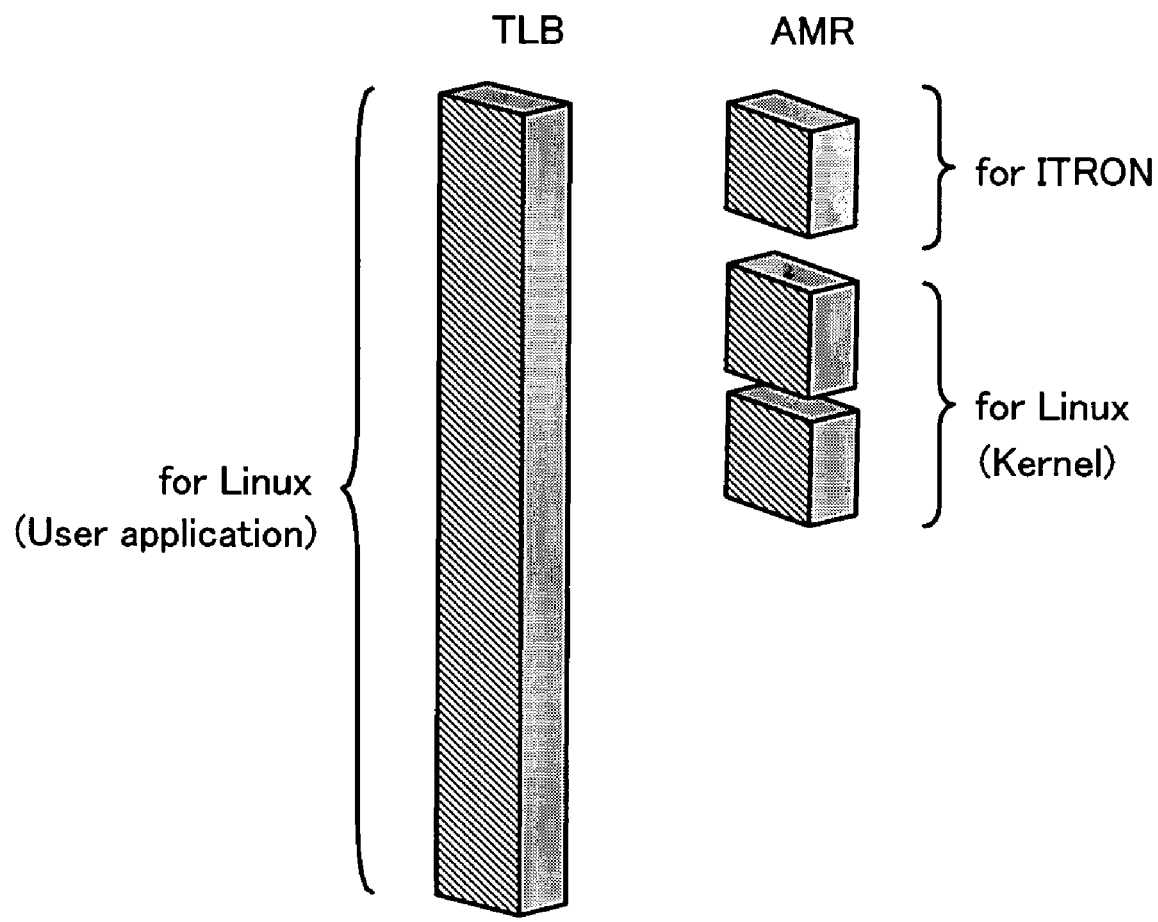
FIG. 6 shows allocation of an address map register (AMR) and a translation Look-aside Buffer (TLB) to OSs.

FIG. 6 shows allocation of an AMR and a TLB to the OSs.

As shown in this figure, the TLB is allocated to the Linux user application while the AMR is allocated to the Linux kernel and ITRON.

Figure 4:
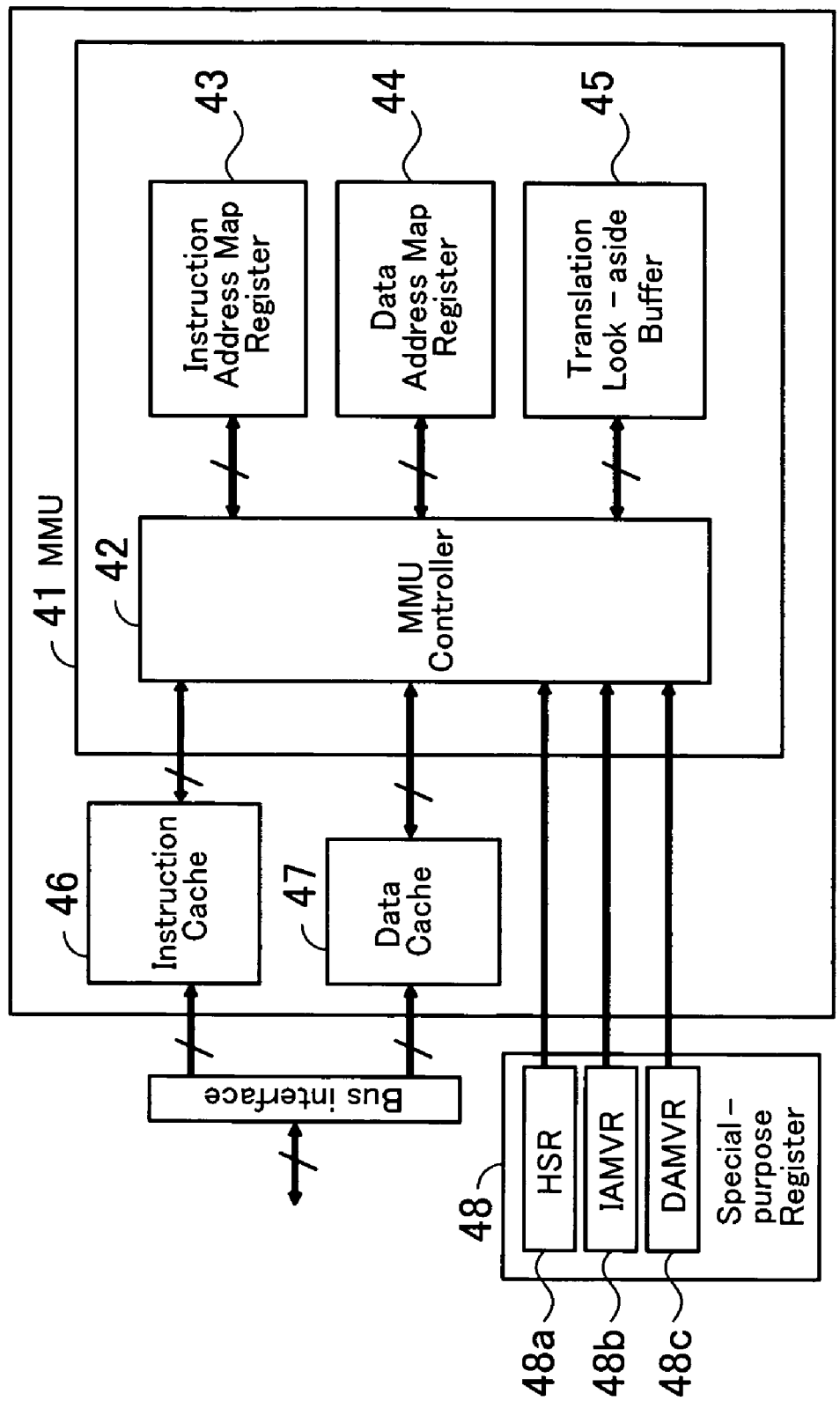
FIG. 4 shows an example of hardware structure of a cache unit.

The TLB of this figure corresponds to the TLB 45 of FIG. 4 and the AMR corresponds to the IAMR 43 and the DAMR 44. For simple explanation, the AMR is shown, with no distinction between an AMR (IAMR 43) for instructions and an AMR (DAMR 44) for data.

Figure 7:
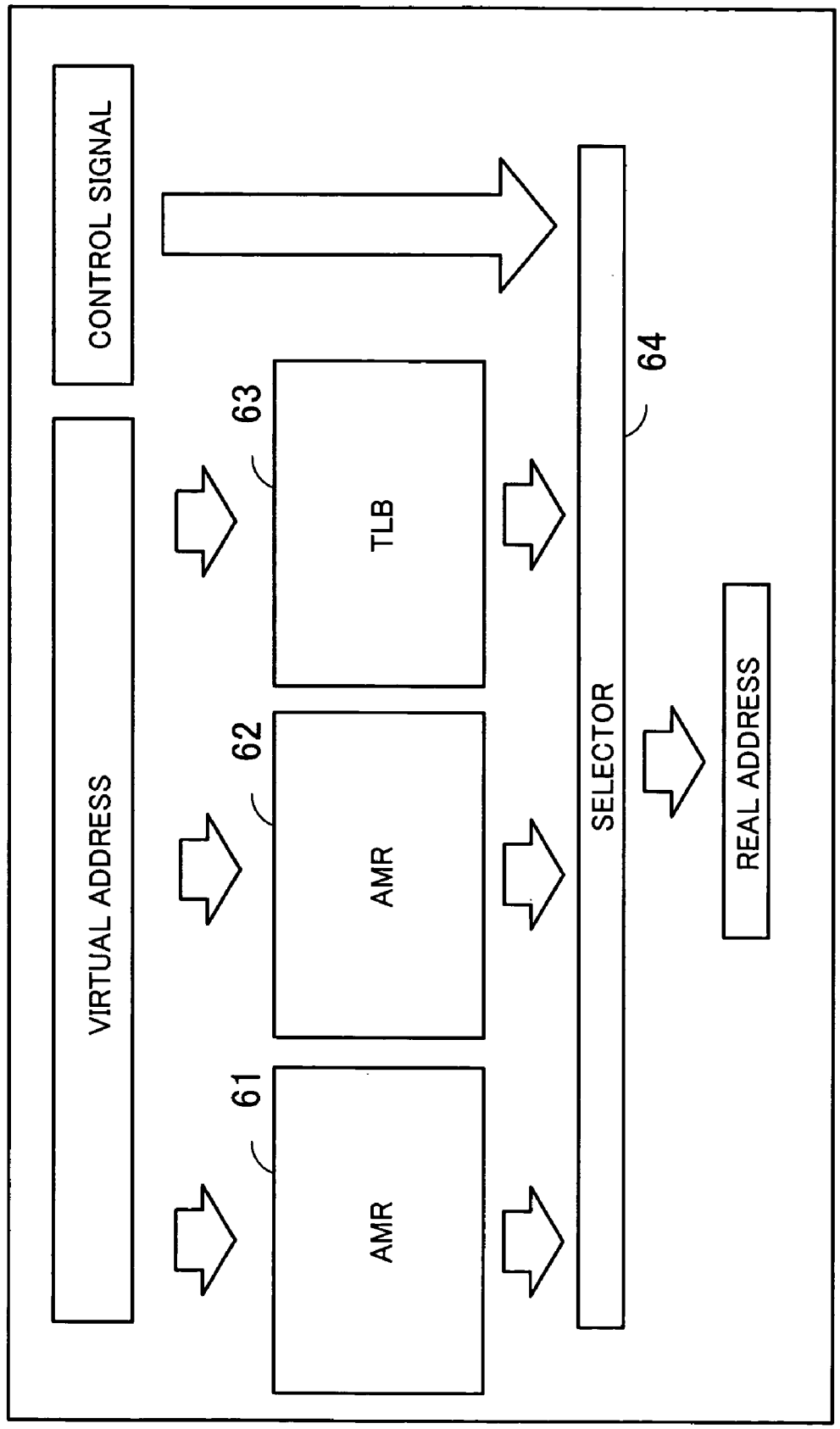
FIG. 7 is a functional block diagram of a memory management unit (MMU) according to the first embodiment.

The functions of the MMU 41 according to the first embodiment will be now described with reference to FIG. 7.

Referring to this figure, the MMU 41 has AMRs 61 and 62, a TLB 63 and a selector 64. The TLB 63 corresponds to the TLB 45 of FIG. 4. The AMRs 61 and 62 correspond to the IAMR 43 and the DAMR 44 of FIG. 4 but are shown, with no distinction between AMRs for instructions and for data.

The AMR 61 stores virtual addresses and real addresses which are used by ITRON.

The AMR 62 stores virtual addresses and real addresses which are used by the Linux kernel.

The TLB 63 stores virtual addresses and real addresses which are used by the Linux user applications.

The selector 64 receives a control signal from the CPU according to an OS, and selectively outputs the real address translated from a virtual address by accessing the AMR 61, 62, and/or TLB 63, based on the control signal.

For example, when the selector 64 receives a control signal from the CPU while ITRON runs, it selectively outputs the real address translated from a virtual address by accessing the AMR 61. When the selector 64 receives a control signal from the CPU while Linux runs, on the other hand, it selectively outputs the real address translated from a virtual address by accessing the AMR 62 and the TLB 63. That is, the selector 64 selects the AMR 61, 62 and/or TLB 63 for the virtual-to-real address translation according to an OS being run by the CPU. Control signals may be output from a control device other than the CPU.

Each of Linux and ITRON use an AMR as shown in FIG. 6. Therefore, if only one AMR is provided, they may interfere with each other. For avoiding the interference, the contents of the AMR should be changed according to Linux or ITRON, whichever is running.

This invention provides the AMR 61 for ITRON and the AMR 62 and the TLB 63 for Linux to output a translated real address in response to a control signal based on an OS. Therefore, the contents of the AMRs are not necessarily changed, resulting in reducing system loads which occur due to algorithms and control circuits. In addition, no change of the contents of the AMRs can reduce an overhead in process.

The second embodiment will be now described in detail with reference to the accompanying drawings.

The first embodiment uses different AMRs for the Linux kernel and for ITRON. This second embodiment, however, uses one AMR and has the same effects as the first embodiment.

Figure 8:
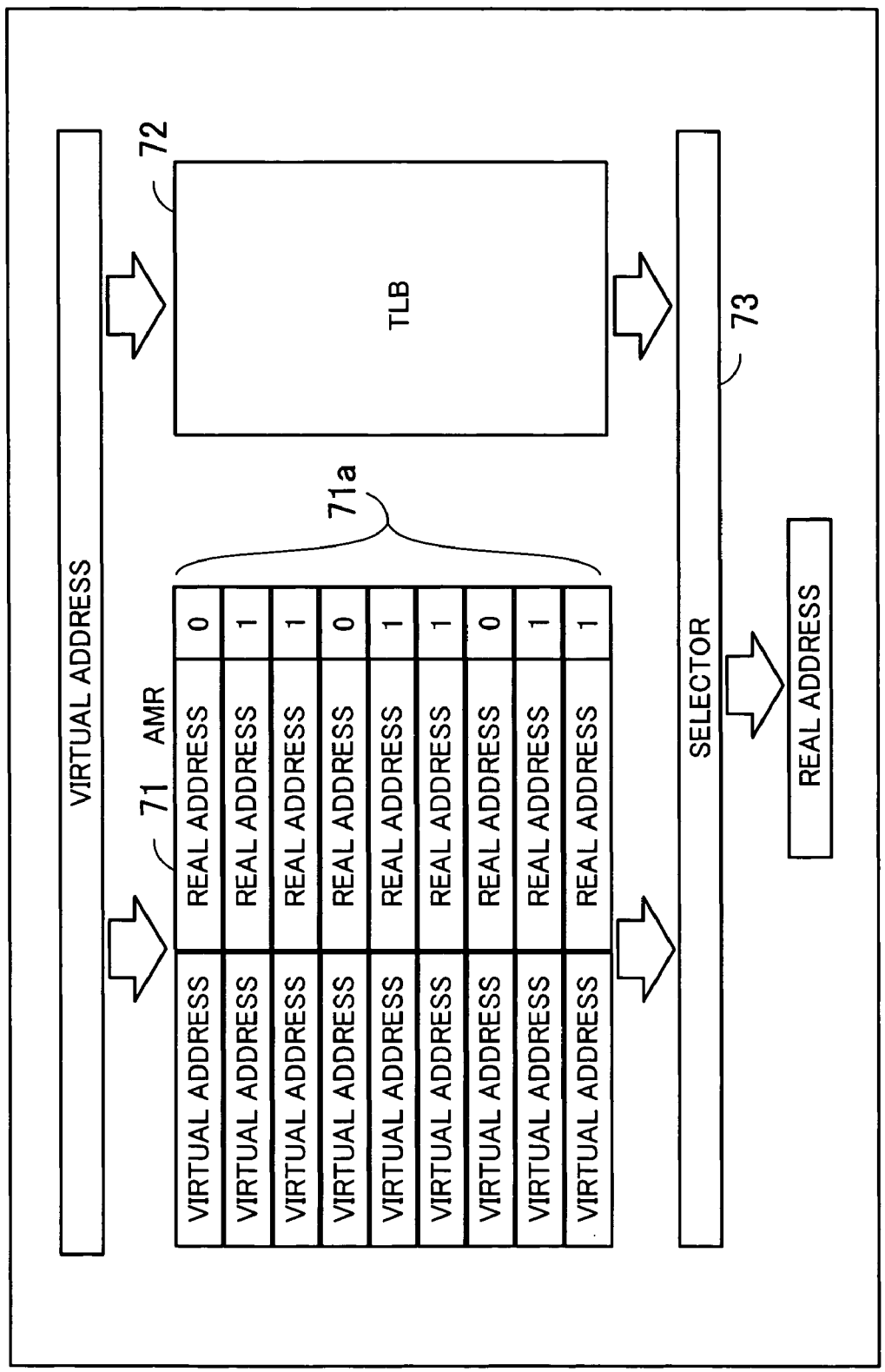
FIG. 8 is a functional block diagram of an MMU according to the second embodiment.

FIG. 8 is a functional block diagram of an MMU according to the second embodiment.

Referring to this figure, the MMU has an AMR 71, a TLB 72, and a selector 73. The TLB 72 corresponds to the TLB 45 of FIG. 4. The AMR 71 corresponds to the IAMR 43 and the DAMR 44 of FIG. 4 but is shown, with no distinction between AMRs for instructions and data.

The AMR 71 stores virtual addresses and real addresses which are used by both ITRON and the Linux kernel. Note that each virtual/real address pairing is assigned a valid bit 71a as shown in this figure. The valid bit is information which indicates which OS the virtual/real address pairing belongs to, ITRON or Linux. For example, the valid bit 0 indicates that a virtual/real address pairing is used by the Linux kernel while a valid bit 1 indicates that a virtual/real address pairing is used by ITRON.

The TLB 72 stores virtual addresses and real addresses which are used by the Linux user applications.

The selector 73 selectively outputs the real addresses translated from virtual addresses with the AMR 71 and/or the TLB 72, on the basis of the valid bits 71a and the contents of an HSR. The HSR is the HSR 48a of FIG. 4, for example, and stores information on a running OS.

On the basis of the valid bits 71a, the selector 73 outputs real addresses translated with the AMR 71. For example, while Linux runs, the selector 73 outputs translated real addresses with a valid bit of 0. While ITRON runs, the selector 73 outputs translated real addresses with a valid bit of 1.

The valid bits 71a are stored in the AMR 71 in association with the virtual/real address pairings. However, a different register (Address Map Valid Register (AMVR)) may be provided to store the valid bits. In this case, the selector 73 accesses the AMVR to output real addresses. Note that the IAMVR 48b and the DAMVR 48c of FIG. 4 correspond to this AMVR. If only one AMVR is provided for the OSs, the contents of the AMVR should be saved and restored in/from, for example, a memory device such as a RAM every time when the OSs are switched.

In addition, according to the contents of the HSR, the selector 73 outputs real addresses translated with the TLB 72. For example, while ITRON runs, the selector 73 does not output real addresses from the TLB 72. While Linux runs, on the contrary, the selector 73 outputs real addresses from the TLB 72. In other words, the selector 73 makes outputs from the TLB 72 valid or invalid according to the contents of the HSR.

Figure 9:
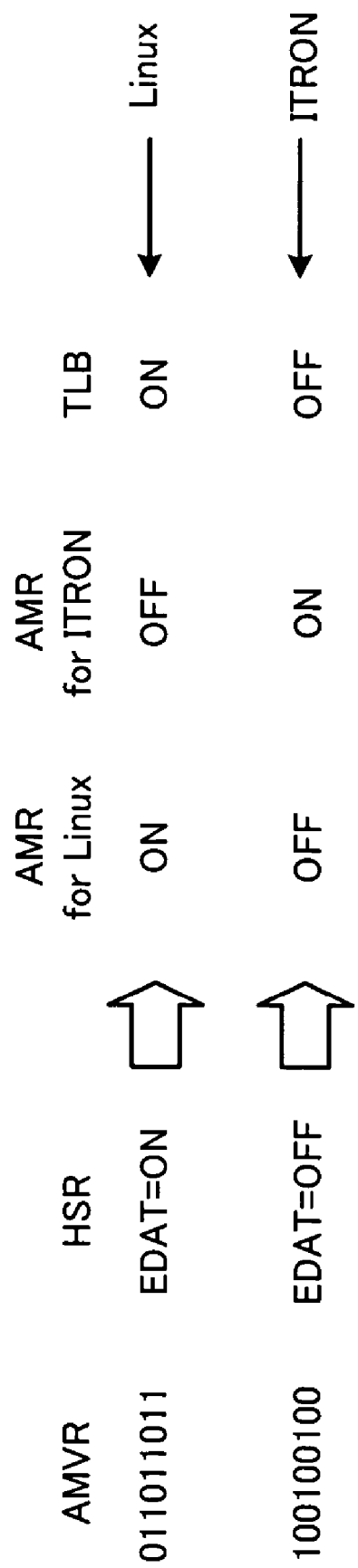
FIG. 9 explains operation in outputting real addresses.

FIG. 9 explains how to output real addresses by using the AMVR.

An EDAT of the HSR shown is information to determine whether to make the real addresses of TLB 72 valid or invalid. EDAT=ON means that Linux is running and therefore the selector 73 makes real addresses from the TLB 72 valid (ON). EDAT=OFF, on the other hand, means that ITRON is running and therefore the selector 73 makes real addresses from the TLB 72 invalid (OFF).

The selector 73 outputs real addresses of the AMR 71 corresponding to bit 0 being stored in the AMVR. For example, a bit on the most left side of the AMVR shown in FIG. 9 corresponds to the top line of the AMR 71 of FIG. 8 while a bit on the most right side of the AMVR corresponds to the bottom line of the AMR 71. When the AMVR indicates 011011011, the selector 73 outputs translated real addresses in the first, fourth, and seventh lines from the top of the AMR 71 of FIG. 8. In a case of 100100100, the selector 73 outputs translated real addresses in the second, third, fifth, sixth, eighth, and ninth lines from the top of the AMR 71 of FIG. 8.

In short, the selector 73 outputs real addresses for the Linux kernel or for ITRON, according to bits set in the AMVR.

As described above, a valid bit is assigned to each virtual/real address pairing and the real addresses of the TLB are made invalid or invalid. Therefore, the contents of the AMR are not necessarily changed, resulting in reducing system loads which occur due to algorithms and control circuits and also reducing an overhead in process. In addition, since the real addresses of the TLB can be made valid or invalid, ITRON and the Linux user applications can be prevented from interfering with each other.

The TLB is normally a set associative RAM or a fully associative RAM. Set associative RAMs are easy to be installed but handle only a fixed page size. Fully associative RAMs can handle various page sizes, but are very difficult to be installed and increase circuit sizes.

Therefore, a set associative RAM is used as a TLB while a fully associative RAM is used as an AMR. For example, the MMU shown in FIG. 7 uses fully associative RAMs as the AMRs 61 and 62 and a set associative RAM as the TLB 63. The MMU shown in FIG. 8 uses a fully associative RAM as the AMR 71 and a set associative RAM as the TLB 72.

In conventional micro processors each of which runs only one OS, even when two address translation buffers, for example, an AMR and a TLB, are usable, the usage of a set associative RAM and a fully associative RAM is fixed according to the OS. That is, their usage cannot be changed while the micro processor operates.

According to this invention, in order to run two OSs, the micro processor manages virtual addresses and real addresses with a TLB (set associative) and an AMR (fully associative), and suitably changes the usage of the TLB and the AMR according to a running OS. This can reduce an overhead in switching between the OSs, and can set optimal conditions according to the OSs with making use of the characteristics of both the set associative and the fully associative, with hardware structure of a simple and inexpensive MMU.

The third embodiment will be now described in detail with reference to the accompanying drawings.

In a case of a set associative TLB, to store a new real address in a full line of the TLB, the real address input overwrites the least-recently used address. If such overwriting frequently happens, performance degrades greatly. As an effective technique to avoid the performance degradation, the number of lines in each set in the TLB is increased. This technique, however, increases a circuit size and a cost.

Since thrashing is more likely to occur continuously, the third embodiment offers techniques to prevent the performance degradation, in which the entries of a fixed page taken out of the TLB are stored in part of a fully associative AMR and in which addresses are directly registered in the AMR if the TLB is full.

Figure 10:
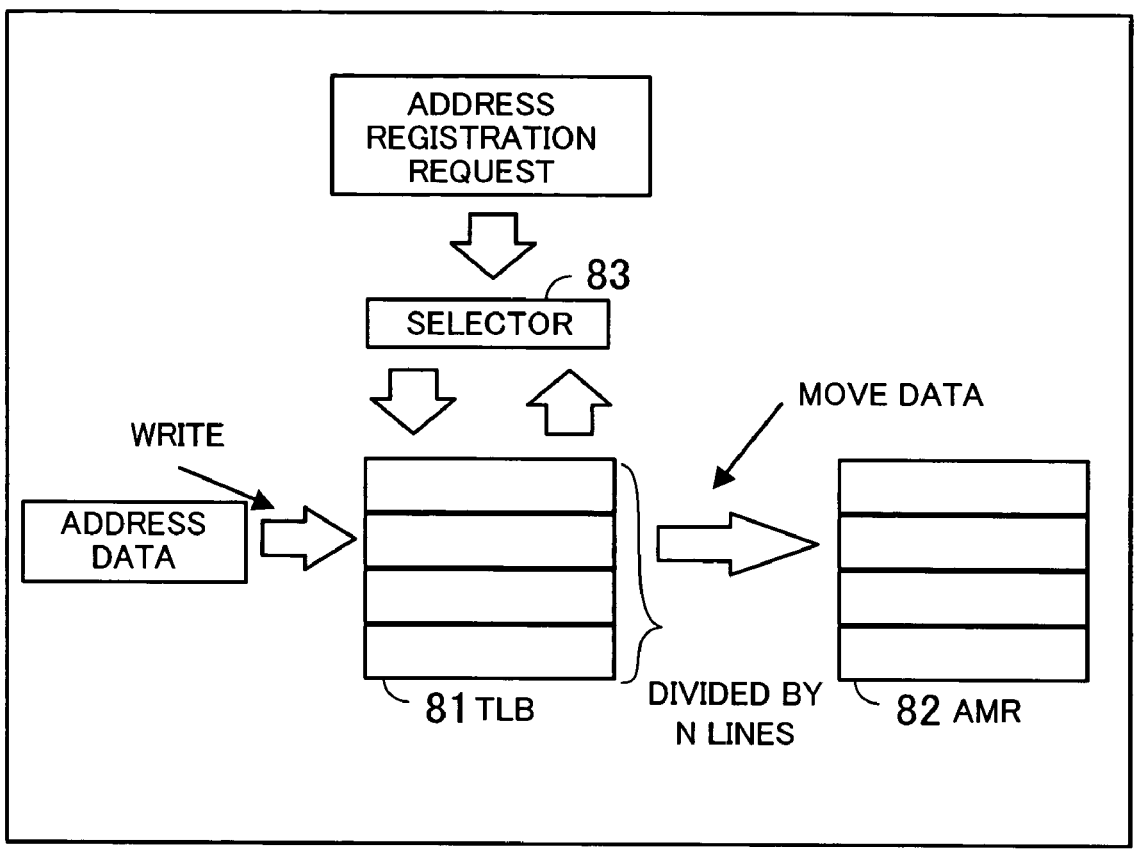
FIG. 10 is a functional block diagram of an MMU according to the third embodiment.

FIG. 10 is a functional block diagram of an MMU according to the third embodiment.

Referring to this figure, the MMU has a TLB 81, an AMR 82 and a selector 83.

The TLB 81 is a N-way set associative TLB, which is divided by N lines (N: integer). The AMR 82 is fully associative.

When a request for registering a new virtual address is made by Linux, the selector 83 determines whether the TLB 81 has free space in a corresponding line. If the TLB 81 has no free space, the selector 83 moves the data of a line storing the least-recently used real address data into the AMR 82. Then the selector 83 registers the new virtual address in the free space of the TLB 81. Alternatively, the selector 83 may directly register the new virtual address by Linux in the AMR 82.

As described with reference to FIG. 6, an AMR is allocated to static ITRON and Linux kernel. Therefore, a region for the dynamic Linux user applications should be created in the static region of the AMR 82.

Figure 11:
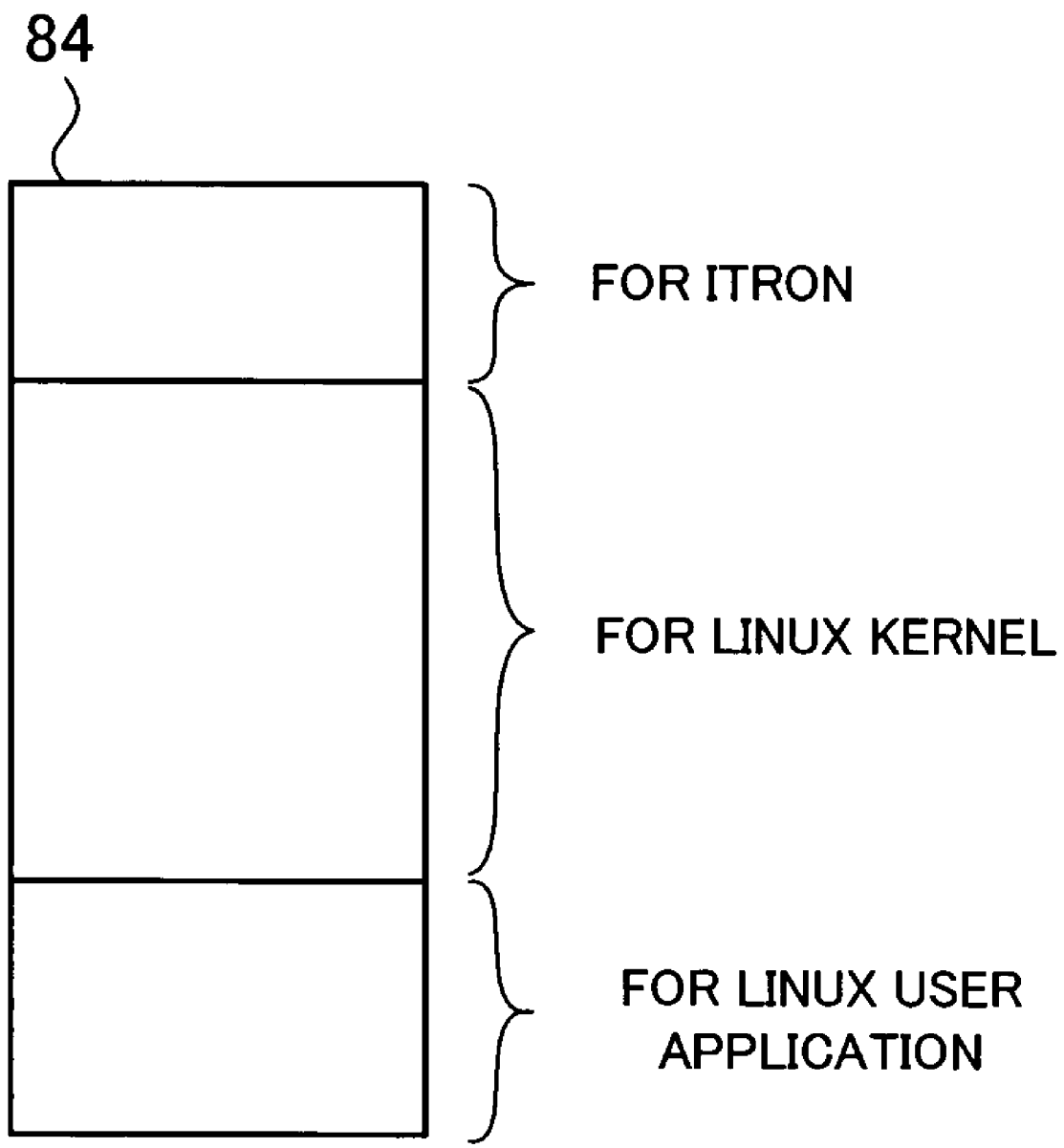
FIG. 11 illustrates a memory map of an AMR.

FIG. 11 shows a memory map of the AMR.

A memory map 84 shown is of the AMR. The memory map 84 has regions for ITRON, the Linux kernel, and the Linux user applications. Therefore, data for the user applications in the TLB can be moved into the AMR.

As described above, the entries of a fixed page taken out of the TLB are saved in part of the AMR. Alternatively, when the TLB has no free space, direct registration in the AMR is made. This can reduce occurrence of thrashing.

Since these techniques can realize such reduction without increasing the number of lines in each set in the TLB, a circuit size can be controlled.

Note that even by storing the least-recently used data taken out of a fully associative buffer (AMR) into a set associative buffer (TLB), occurrence of thrashing can be reduced.

Next, the fourth embodiment will be described in detail with reference to the accompanying drawings.

An AMR should be allocated to the dynamic Linux user applications as shown in FIG. 11 so that the Linux user applications do not interfere with the Linux Kernel and ITRON. In other words, the allocation should be made so that the CPU does not access a region for the Linux user applications while running ITRON, and conversely the CPU does not access a region for ITRON while running Linux.

For the allocation, entry information is given to each virtual/real address pairing, the entry information indicating whether the virtual address and the real address are dynamic entries (for Linux user applications) or static entries (for Linux kernel or ITRON). Then the address translation is made according to an OS on the basis of the entry information given to the virtual/real address pairings.

Figure 12:
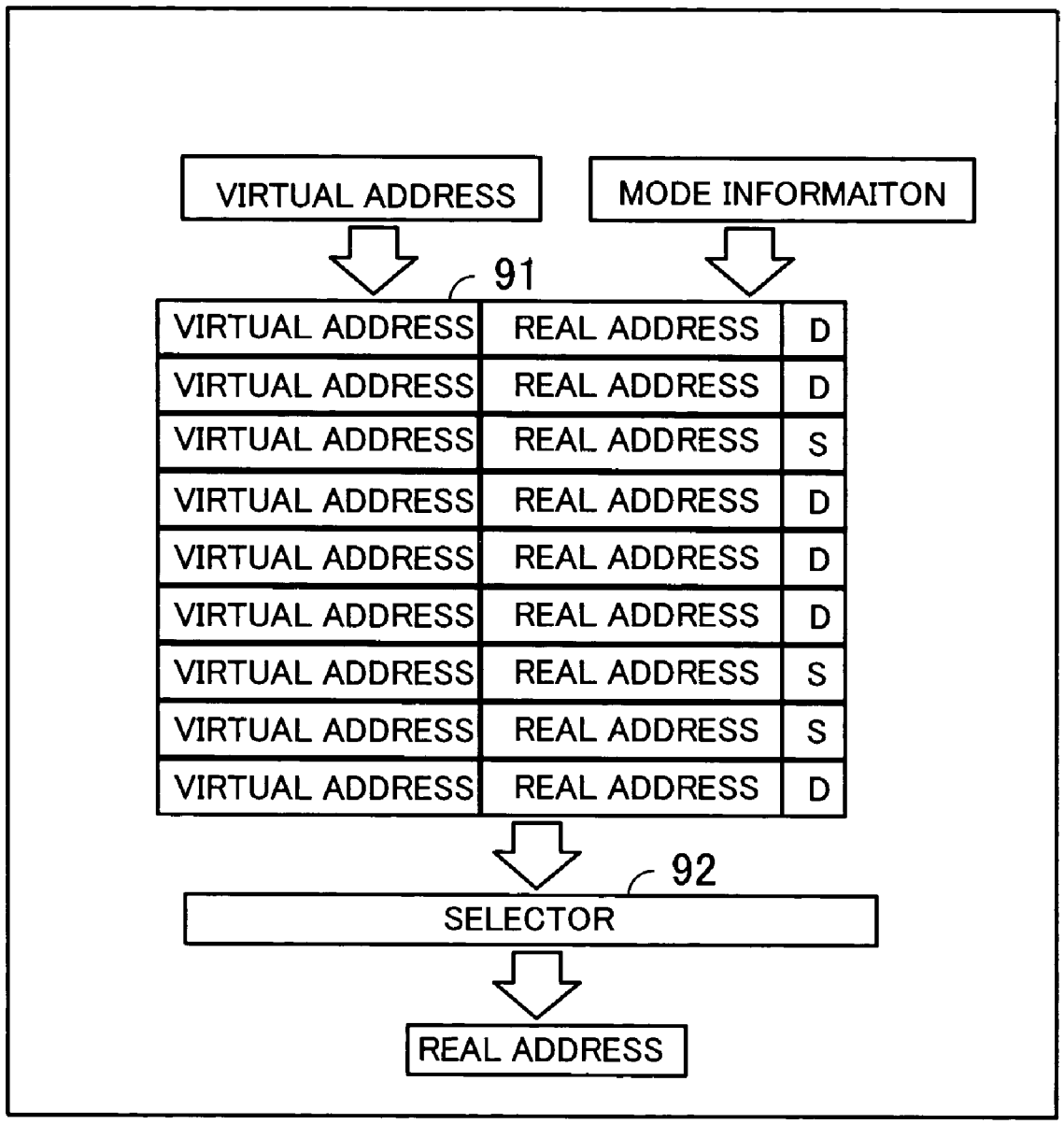
FIG. 12 is a functional block diagram of an MMU according to the fourth embodiment.

FIG. 12 is a functional block diagram of an MMU according to the fourth embodiment.

Referring to this figure, the MMU has an AMR 91 and a selector 92. Note that a TLB is not shown.

The AMR 91 stores virtual addresses and real addresses which are used by ITRON, the Linux kernel and the Linux user applications. Note that entry information is given to each virtual/real address pairing as shown in this figure. The entry information indicates whether a virtual address and a real address are dynamic entries or static entries.

For example, virtual/real address pairings which are used by ITRON and the Linux kernel are given entry information of S indicating static entries. Virtual/real address pairings which are used by the Linux user applications are given entry information of D indicating dynamic entries. Note that the entry information is given when a virtual address and a real address are registered in the AMR 91.

The selector 92 outputs real addresses according to an operation mode (static mode while ITRON runs or dynamic mode while Linux runs), on the basis of the entry information. For example, in the static mode, the selector 92 outputs the real addresses translated from virtual addresses with entry information of S. In the dynamic mode, on the other hand, the selector 92 outputs real addresses with entry information of D.

In addition, in the selector 92, a retrieval priority of addresses in the dynamic mode is set as an order from dynamic entries to static entries. A retrieval priority of addresses in the static mode is set as an order from static entries to dynamic entries. This is because, in a situation where the same region is used for both the dynamic entries and the static entries and two different real addresses correspond to the same virtual address, when a request for translating the virtual address to a real address is made, the two real addresses are retrieved. To avoid this happening, for example, in the dynamic mode, the virtual-to-real address translation based on the dynamic entries is first performed, and if a corresponding real address does not exist, the address translation based on the static entries is performed.

As described above, each virtual/real address pairing is given entry information specifying dynamic entries or static entries and is stored. Then on the basis of the entry information, real addresses are output according to an operation mode. This can prevent the dynamic entries and the static entries from interfering with each other.

In addition, a Linux user region (user application region) is created in part of a Linux kernel region. To dynamically change the user region, the kernel region is set as a region for static entries and the user region is set as a region for dynamic entries. Then a retrieval priority in Linux is set as an order from dynamic entries to static entries, so that the retrieval is performed from the user region to the kernel region. In addition, a retrieval priority in ITRON is set as an order from static entries to dynamic entries, so that the retrieval is performed from the kernel region to the user region. By doing this, flexible address translation can be set easily.

Note that the dynamic entries in set associative are referred to as fixed entries in terms of a fixed page size while the static entries in fully associative are referred to as variable entries in terms of a variable page size.

The fifth embodiment will be now described in detail with reference to the accompanying drawings.

As described in the fourth embodiment, the address translators capable of simultaneously performing dynamic address translation and static address translation are very flexible and cost-effective. However, to access the data of a desired dynamic entry or static entry, an operation mode should be changed. The fifth embodiment provides an LRA command to access a desired static entry or dynamic entry, regardless of an operation mode. In addition, a CPU is notified of an exception report on, for example, a case where address translation could not be performed, by using bits (in-page offset bits) where virtual address=real address.

Figure 13:
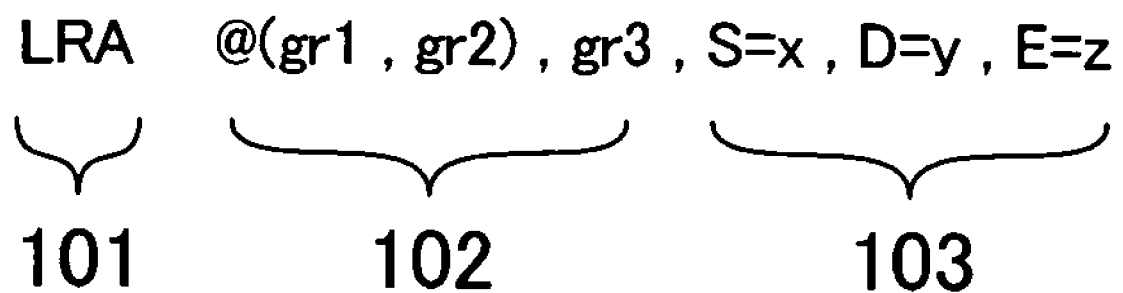
FIG. 13 shows a command to be issued to an MMU according to the fifth embodiment.

FIG. 13 shows a command to be issued to an MMU according to the fifth embodiment.

As shown in this figure, this command is divided into three fields 101, 102 and 103. The field 101 indicates a command code (LRA) of a program capable of desirably accessing a dynamic entry and a static entry regardless of an operation mode. The field 102 contains an address to be translated. The field 103 contains information specifying an operation mode. In addition, information indicating whether an exception report on whether the address translation could be performed is required is set. Note that x, y, z in this figure are 0 or 1.

With the MMU of FIG. 12 as an example, when the field 103 contains S=0, the static entries of the AMR 91 are not searched for address translation. When S=1, on the contrary, the static entries of the AMR 91 are searched for the address translation. When D=0, the dynamic entries of the AMR 91 and the TLB are not searched for the address translation. When D=1, the dynamic entries of the AMR 91 and the TLB are searched for the address translation.

As a result, by setting S, D=1, 0, the same operation as the static mode can be realized. By setting S, D=0, 1, the same operation as the dynamic mode can be realized. By setting S, D=1, 1, both entries are searched for address translation regardless of an operation mode.

Therefore, the dynamic entries and the static entries can be desirably accessed regardless of an operation mode.

When the field 103 indicates E=0, an exception report is not sent to the CPU. When E=1, on the contrary, the exception report is sent to the CPU. For example, when a real address corresponding to a virtual address requested to be translated does not exist, the CPU is not informed of this matter when E=0, or the CPU is informed of this matter when E=1.

Conventionally, such an exception report is made differently from the address translation, for example. Therefore, different operations are required for obtaining the exception report and a result of address translation, which is troublesome. This invention uses bits where virtual address=real address, or, in-page offset bits for the exception report, which offers easy use.

For example, assume that virtual addresses and real addresses are each comprised of 32 bits. When the lower 16 bits of a virtual address and a real address are the same, the real address can be specified by the higher 16 bits. In this case, since the lower 16 bits of the real address have no information for specifying the address, the lower 16 bits are used for an exception report. Such addition of an exception report to a real address by using in-page offset bits for an exception report in this way offers easy use.

If a dynamic entry and a static entry match each other when S, D=1, 1, one entry with a higher priority is retrieved by the address translation.

The address translator of this invention classifies and stores virtual addresses and real addresses in address translation buffers by operating systems, so as to perform virtual-to-real address translation according to a running operating system. Therefore, change of the contents of the address translation buffers is unnecessary when the operating systems are switched, which can reduce system loads. In addition, an overhead in switching between the operating systems can be reduced.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An address translator for translating virtual addresses to real addresses, comprising:
   a first fully associative address translation buffer that stores the virtual addresses and the real addresses of first static entries for a real-time operating system, second static entries for a non-real-time operating system, and dynamic entries for applications which run on the non-real-time operating system, the real-time operating system required to perform real-time processing, the non-real-time operating system required to perform non-real-time processing;
   a second set associative address translation buffer that stores the virtual addresses and the real addresses of the dynamic entries; and
   an address translation controller that accesses the first fully associative address translation buffer to perform address translation by using the virtual addresses and the real addresses of the first static entries stored in the first fully associative address translation buffer when a central processing unit operates the real-time operating system, and accesses the first fully associative address translation buffer and the second set associative address translation buffer to perform the address translation by using the virtual addresses and the real addresses of the second static entries and the dynamic entries stored in the first fully associative address translation buffer and the virtual addresses and the real addresses of the dynamic entries stored in the second set associative address translation buffer when the central processing unit operates the non-real-time operating system.

2. The address translator according to claim 1, wherein, when the central processing unit operates the real-time operating system, the address translation controller hides the second static entries and the dynamic entries of the first fully associative address translation buffer and the dynamic entries of the second set associative address translation buffer such that the central processing unit does not perform the address translation by using the virtual addresses and the real addresses of the second static entries and the dynamic entries stored in the first fully associative address translation buffer and the virtual addresses and the real addresses stored in the second set associative address translation buffer, and when the central processing unit operates the non-real-time operating system, the address translation controller hides the first static entries of the first fully associative address translation buffer such that the central processing unit does not perform the address translation by using the virtual addresses and the real addresses of the first static entries stored in the first fully associative address translation buffer.

3. The address translator according to claim 1, further comprising:
   a register which collectively stores valid bits each indicating validity of address translation from a virtual address to a real address, the virtual address and the real address stored in the first fully associative address translation buffer; and
   a register controller that collectively saves and stores the valid bits in the register when an operating system is switched between the real-time operating system and the non-real-time operating system,
   wherein the address translation controller performs the address translation with reference to the register.

4. The address translator according to claim 1, further comprising:
   wherein, when least-recently used data is taken out of the first fully associative address translation buffer, the least recently used data is moved to the second set associative address translation buffer.

5. The address translator according to claim 1, further comprising:
   wherein, when least-recently used data is taken out of the second set associative address translation buffer, the least-recently used data is moved to the first fully associative address translation buffer.

6. The address translator according to claim 1, wherein when the dynamic entries and the static entries of the first fully associative address translation buffer use the same region, the dynamic entries and the static entries have an order of priority for address translation.

7. The address translator according to claim 1, wherein in accordance with program commands executed by the central processing unit, the address translation controller performs the address translation on the first static entries and the second static entries or on the dynamic entries, or performs the address translation on the first static entries and the second static entries or on the dynamic entries according to an order of priority given to the first static entries, the second static entries, and the dynamic entries.

8. The address translator according to claim 7, wherein the address translation controller returns status information relating to the address translation to the central processing unit by using in-page offset bits.

* * * * *